(12) United States Patent
Bleile et al.

(10) Patent No.: US 11,726,470 B2
(45) Date of Patent: Aug. 15, 2023

(54) METHOD AND DEVICE FOR DETERMINING A MEASURE OF QUALITY CONTINUOUSLY

(71) Applicant: Robert Bosch GmbH, Stuttgart (DE)

(72) Inventors: Thomas Bleile, Stuttgart-Zuffenhausen (DE); Christina Hoepfner, Bergen (DE); Rene Huck, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 68 days.

(21) Appl. No.: 17/447,858

(22) Filed: Sep. 16, 2021

(65) Prior Publication Data

US 2022/0128956 A1 Apr. 28, 2022

(30) Foreign Application Priority Data

Oct. 26, 2020 (DE) .......................... 102020213439.1

(51) Int. Cl.
*G05B 23/02* (2006.01)
*G05B 13/04* (2006.01)

(52) U.S. Cl.
CPC ....... *G05B 23/0294* (2013.01); *G05B 13/042* (2013.01)

(58) Field of Classification Search
CPC .............. G05B 23/0294; G05B 13/042; G05B 23/0254; G05B 23/02; G01B 3/10
See application file for complete search history.

(56) References Cited

U.S. PATENT DOCUMENTS

| 2003/0171901 | A1* | 9/2003 | Salsbury | G06F 17/11 703/2 |
| 2004/0181300 | A1* | 9/2004 | Clark, Jr. | G05B 13/048 700/30 |
| 2014/0297002 | A1* | 10/2014 | Ji | G05B 13/048 700/30 |
| 2019/0072942 | A1* | 3/2019 | Park | G05B 13/048 |
| 2019/0101908 | A1* | 4/2019 | Park | G05B 23/024 |
| 2021/0286324 | A1* | 9/2021 | Hiroe | G05B 6/02 |

\* cited by examiner

*Primary Examiner* — Christopher E. Everett
(74) *Attorney, Agent, or Firm* — Norton Rose Fulbright US LLP; Gerard Messina

(57) ABSTRACT

A method of continuously determining a measure of quality for a control device of a technical device or for a system model of a technical system, from an input variable and an output variable. Time series of the input variable and the output variable are acquired up to a time step. A discrete ARMAX model structure is adapted for the ascertained, corresponding time series of the input variable and output variable, in order to determine a first set of parameters for modeling the time series of the input variable and a second set of parameters for modeling the time series of the output variable. The measure of quality is determined for the time step as a function of the first and the second set of parameters.

13 Claims, 2 Drawing Sheets

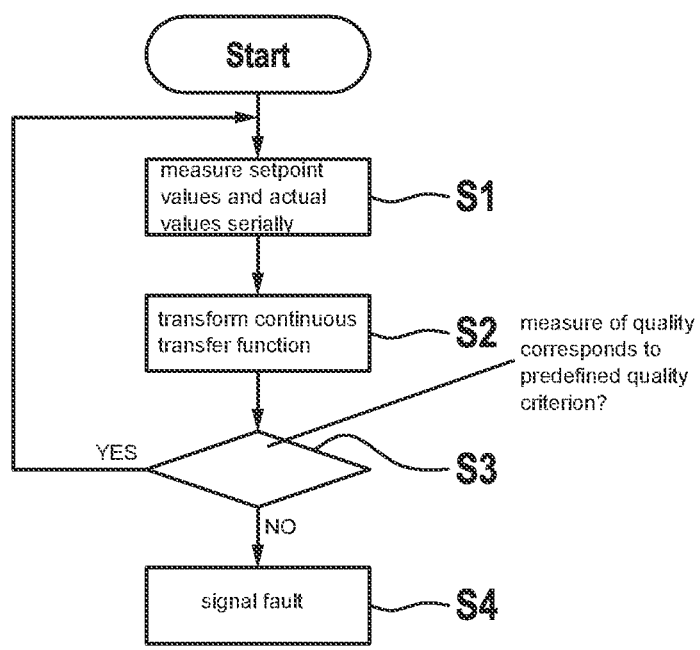

METHOD AND DEVICE FOR DETERMINING A MEASURE OF QUALITY CONTINUOUSLY

CROSS REFERENCE

The present application claims the benefit under 35 U.S.C. § 119 of German Patent Application No. DE 102020213439.1 filed on Oct. 26, 2020, which is expressly incorporated herein by reference in its entirety.

FIELD

The present invention relates to system models and control devices for technical systems, and to, in particular, methods for determining a measure of quality of system models and controllers, in particular, for detecting errors or for support in controller design.

BACKGROUND INFORMATION

Control devices are often used in technical systems, in order to control a technical device, using a correcting variable, in such a manner, that a control target is reached. The control target is defined by inputting a setpoint, and the attainment of the control target is checked by measuring a process variable. The control device is used to correct the process variable to the predefined setpoint as effectively as possible.

In the ideal case, the control device causes the process variable to correspond to the setpoint at all times. In reality, however, a delayed reaction of the process variable occurs in response to dynamic change of the setpoint and due to the dynamic response of the technical device.

Consequently, a quality of such a control device indicates a measure of how accurately and how rapidly a process variable tracks a specified, dynamic setpoint. If a controller is designed incorrectly, then the process variable may track the setpoint overly slowly, or the process variable may overshoot the setpoint. Such incorrect designs of a controller may be quantified with the aid of a measure of quality.

Alternatively, in other fields of application, system models, which simulate the physical behavior of a technical system, may be generated. These may be used, e.g., for simulations or in observers of control devices.

These system models do not often model the behavior of the technical system equivalently in all operating ranges, which means that a corresponding measure of quality may vary. In particular, complex frequency-dependent behavior of the technical system may result in marked differences between the modeled behavior of the technical system and the actual behavior of the technical system. Thus, a measure of quality, which indicates the exactness of the modeled behavior with respect to the actual behavior at a particular operating point of the technical system, may also be defined for such system models.

SUMMARY

The present invention provides a method of continuously determining a measure of quality for a control device of a technical device or for a system model of a technical system, as well as a device and a fault detection system.

Refinements and example embodiments of the present invention are disclosed herein.

According to a first aspect of the present invention, a method of determining a measure of quality for a control device of a technical device or for a system model of a technical system, from an input variable and an output variable, is provided. In accordance with an example embodiment of the present invention, in the method, time series of the input variable and the output variable are acquired up to a time step; a discrete ARMAX model structure is adapted for the ascertained, corresponding time series of the input variable and output variable, in order to determine a first set of parameters for modeling the time series of the input variable and a second set of parameters for modeling the time series of the output variable; the measure of quality is determined for the time step as a function of the first and the second set of parameters.

A measure of quality may indicate a control performance of a control device and a model quality for modeling, by which a behavior of a system is intended to be simulated.

Generally, a control performance may be ascertained as a measure of quality not during continuous operation, or only in random samples, but not for an entire operating range of a technical device to be controlled. Consequently, inadequate control response may be reliably detected only in certain operating scenarios, while generally, assertions regarding other operating ranges, as well as continuously over a characteristic of the measure of quality, are not possible. In particular, a control device having a minimum control performance is necessary in the case of systems critical with regard to safety or in the area of internal combustion engines, in which emissions requirements must be adhered to at all possible operating points.

To model a technical system, the system behavior is simulated with the aid of a system model. With the aid of a quality appraisal, such a system model may be optimized either in a simulation or during use of the technical device in a technical system.

Such a system model may be modeled, for example, in the form of a PT2 element, in which model parameters, that is, a gain, a time constant, and a damping coefficient, must be calibrated. If only few measurement data are available for determining the model parameters, this may result in the ascertained model parameters not being representative of other scenarios, that is, other operating ranges, and may result in less effective modeling of the technical system. As a rule, adaptation of the system model through expert knowledge is only possible with difficulty, since for this, the system behavior in many or all operating ranges would have to be taken into account.

According to the above method, a measure of quality for a control device of a technical device or for a system model, by which a system behavior is intended to be modeled, is ascertained. In this manner, the measure of quality may be ascertained online, that is, during continuous operation, in the entire control range and/or operating range, and for different operating scenarios.

One feature of the above method in accordance with the present invention is to determine the measure of quality in light of the sets of parameters of an ARMAX model, which is adapted to time series of an input variable and an output variable. The time series of the input variable and the output variable represent the important dynamic characteristics of the control device and/or of the system model.

The models forming the basis of ARMAX may include almost any discrete models at all, whose parameters are fitted to the variables to be considered. In this context, the number of parameters to be optimized is, as a rule, not limited, since the system is overdetermined in accordance with the length of the time series considered. There is a model equation for each time step, which means that in an optimization method (e.g., least squares), sufficient data are available in order to fit the parameters.

For example, a PT2 element may be selected as a transfer function for ascertaining a measure of quality of a control device; the setpoint being able to be adapted as an input variable, and the process variable being able to be adopted as an output variable. For each time step, model parameters of the continuous transfer function, in particular, a gain, a time constant, and a damping coefficient, may be determined from each of the identified sets of parameters of the discrete system; the measure of quality being determined from these model parameters.

The control performance of a control device may be measured, using the corresponding rate, at which the process variable is corrected to the setpoint, and a transient response during the attainment of a setpoint value of the setpoint. In particular, the rate, at which the process variable is corrected to the setpoint, may be expressed by time constant T of the PT2 element, while the transient response during the attainment of the setpoint value of the setpoint is characterized by damping coefficient D. If the actual value is not able to be permanently corrected to the setpoint value, then a lasting system deviation occurs. This may be detected, if gain K of the PT2 element is clearly not equal to K=1 for a relatively long period of time.

The measure of quality may be ascertained with the aid of a conventional recursive ARMAX (Autoregressive Moving Average Module with Exogenous Input Model) algorithm, in which the model parameters are ascertained on the basis of time series of input and output variables and new calculations take into account computational results of preceding time steps.

According to one specific embodiment of the present invention, the measure of quality of a control device may be determined by selecting a predefined setpoint as an input variable and a predefined process variable as an output variable of the control device; the control device having a transfer function; model parameters of the transfer function, in particular, a gain, a time constant, and a damping coefficient, being determined from the first and the second set of parameters; the measure of quality being determined from the model parameters.

In order to optimize the transfer function with regard to the transfer function parameters, according to an iterative optimization method, the time constant, the damping coefficient, and the gain may be determined at each time step, by calculating back into the continuous system. In this context, the ARMAX algorithm functions as a least squares optimizer, which may be based on a discrete-time PT2=f(D, T, K) as a model and fits this as effectively as possible to the measurement data via adjustment of the time constant and the damping coefficient. The measure of quality may be derived from the model parameters, namely, the gain, the time constant, and the damping coefficient.

The sets of parameters may be ascertained, assuming a noise level of 0.

In particular, the measure of quality may be determined as a function of a difference of the damping coefficient from a value of 1 and a difference of the time constant from a predefined setpoint value. In addition, the measure of quality may be a function of the difference of the gain from a value of 1.

Furthermore, the measure of quality may be used for adapting the control device of the technical device.

A fault of the control device may be detected as a function of the values or of a change in the measure of quality, and in response to the detection of a fault, this may be signaled.

To evaluate the system model, an output variable of a system model and an actual (measured) system variable, which models the system behavior, may be correspondingly adopted as an input variable.

Accordingly, in accordance with an example embodiment of the present invention, a system model may be evaluated by providing a system variable modeled by the system model as an input variable on a predefined characteristic of one or more control variables. The measured system behavior is used as an output variable; a system variable measured in the actual technical system being adopted as an output variable. The measure of quality of the system model is derived in accordance with the above procedure, in that model parameters of the system model are determined from the first and the second sets of parameters. The advantage over calibration from the time characteristic is the quantity of measurement data available in a determination of the measure of quality during continuous operation.

In particular, the system model may be adapted as a function of the measure of quality, in order to model the actual behavior of the technical system more effectively.

According to a further aspect of the present invention, a device is provided for, in particular, continuously determining a measure of quality for a control system of a technical device or for a system model of a technical system, from an input variable and an output variable. In accordance with an example embodiment of the present invention, the device is configured to acquire time series of the input variable and the output variable up to a time step; a discrete ARMAX model structure being adapted for the ascertained, corresponding time series of the input variable and output variable, in order to determine a first set of parameters for modeling the time series of the input variable and a second set of parameters for modeling the time series of the output variable, and in order to determine the measure of quality for the time step as a function of the first and the second set of parameters.

BRIEF DESCRIPTION OF THE DRAWINGS

Below, specific embodiments are explained in greater detail on based on the figure.

FIG. 3 shows a flow chart for illustrating a method of online fault detection in the controlled system of FIG. 1, in accordance with an example embodiment of the present invention.

DETAILED DESCRIPTION OF EXAMPLE EMBODIMENTS

Figure 1:
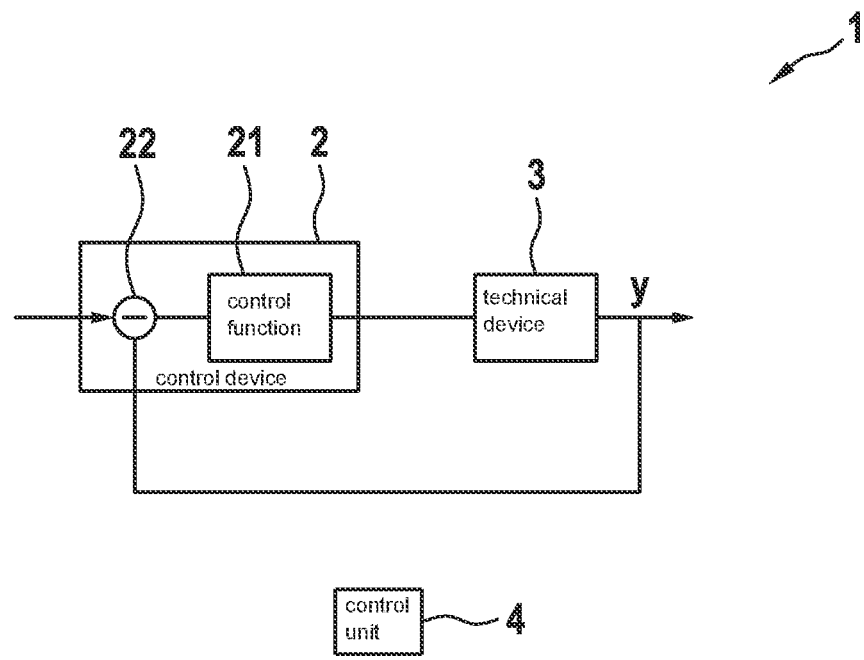
FIG. 1 shows a schematic representation of a controlled system, in accordance with an example embodiment of the present invention.

FIG. 1 shows a schematic representation of a controlled system 1 including a control device 2 and a technical device 3. The control device has a parameterizable control response corresponding to a control function 21. From a differential element 22, the control device receives, as an input variable, a system deviation between a predefined setpoint value of a setpoint u and a measured, actual value of a process variable y, which is produced in accordance with a behavior of technical device 3.

In practice, a transfer function is established between predefined setpoint u and the process variable y resulting from the control device. Control function 31 may be formed in different ways, in particular, as a PID controller or the like.

The system behavior of the control device may be characterized with the aid of a PT2 transfer function. The PT2 transfer function is determined substantially by the model parameters gain K, time constant T and damping coefficient D. The transfer function of the PT2 element corresponds to $$G(s) = \frac{Y(s)}{U(s)} = \frac{K}{T^2 s^2 + 2DTs + 1}$$

where $$T = \frac{1}{\omega_0^2}$$

and $\omega_0$ corresponds to the natural angular frequency.

In this context, time constant T determines the rate, at which process variable y is corrected to setpoint u. The transient response, that is, overshoot of, or the overly slow approach of, the respective, predefined setpoint value, is determined by damping coefficient D.

Figure 2:
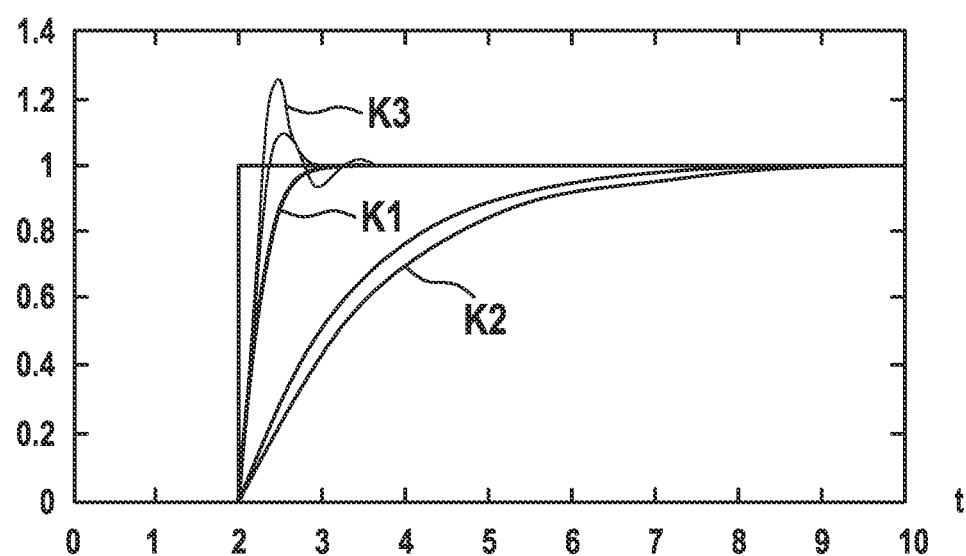
FIG. 2 shows a schematic representation of a transfer function having different damping coefficients and time constants.

Examples of characteristics of the transfer function for different damping coefficients D and time constants T are shown in FIG. 2. Curve K1 shows an ideal, best-possible characteristic of the transfer function of the control device, while curve K2 has a characteristic having a damping coefficient that is overly high, and K3 has a characteristic having a time constant and/or damping coefficient that is overly low.

A control unit 4 is provided, which monitors the control device of the controlled system. In this context, control unit 4 is configured to determine a measure of quality G, as a function of which the control function of technical system 1 is adapted, or as a function of which a fault is signaled, e.g., if the control device no longer satisfies a predefined quality criterion in a particular operating range of technical system 1.

In the following, the method for operating controlled system 1 is described in more detail with the aid of the flow chart of FIG. 3. The method may be implemented in the control unit in the form of hardware and/or software.

In step S1, setpoint values u(t) of the setpoint and actual values y(t) of the process variable in controlled technical system 1 are measured serially at predetermined times, in particular, in regular time steps t=1, 2, .... Now, from the time series of setpoint (input variable) u and process variable (output variable) y, coefficients a and b may be ascertained in each time step in accordance with an ARMAX model (Autoregressive Moving Average Model with Exogenous Inputs), under the condition that at each time, the setpoint value of the setpoint corresponds to the actual value of the process variable.

The ARMAX model structure fulfills $$y(t)+a_1 y(t-1)+\ldots+a_{n_a} y(t-n_a)=b_1 u(t-n_k)+\ldots+b_{n_b} u(t-n_k-n_b+1)+c_1 e(t-1)+\ldots+c_{n_c} e(t-n_c)+e(t)$$

and $$A(q)y(t)=B(q)u(t-n_k)+C(q)e(t)$$

where y(t) corresponds to the value of the output variable at a time step t currently considered, $n_a$ corresponds to the number of poles, $n_b$ corresponds to the number of zeroes+1, $n_c$ corresponds to the number of coefficients for modeling a noise level, $n_k$ corresponds to the number of input values of the input variable, which are ascertained before the input of the control device and/or of the system model influences the output variable (delay), $y(t-1) \ldots y(t-n_a)$ correspond to preceding output variables, on which the current value of the output variable depends, and $u(t-n_k) \ldots u(t-n_k-n_b+1)$ correspond to previous and delayed values of the input variable, on which the current output variable depends, and $e(t-1) \ldots e(t-n_c)$, correspond to a time characteristic of a disturbance variable.

In step S2, the continuous transfer function of the PT2 element $$G(s) = \frac{Y(s)}{U(s)} = \frac{K}{T^2 s^2 + 2DTs + 1}$$

is transformed to a discrete-time model, e.g., by a z-transformation, in order to determine sets of parameters a, b. Thus, for a PT2 transfer function, na=2 (2 poles), nb=2 (number of zeroes+1), and nc=0 (number of coefficients for white noise), and nk=1 (delay). The discrete-time PT2 transfer function is determined by the current time step and the two previous time steps. The time-discretized PT2 transfer function is used in the ARMAX algorithm, so that the coefficients of the z-transformed PT2 transfer function may be ascertained. Amplification constant (gain) K, damping coefficient D, and time constant T may be determined by inverse transformation to the time domain.

With the coefficients to be identified, a first set of parameters A $a_1, a_2, \ldots, a_{na}$ and a second set of parameters B $b_1, b_2, \ldots, b_{nb}$, and $c_1, c_2, \ldots, c_{nc}$=0, then, for the adjusted case, setpoint value u(t) of setpoint u corresponds to actual value y(t) of process variable y for the current time step t considered. To that end, as a criterion, it may be stipulated that the sum of all coefficients $a_1, a_2, \ldots, a_{na}$ be equal to the sum b of all coefficients $b_1, b_2, \ldots, b_{nb}$. A difference between the sum of the coefficients may be identified as a system deviation and represent a measure of quality. If this difference does not correspond to the value in the adjusted state in a lasting manner, then, as a consequence, a lasting system deviation may be detected.

Thus, a lasting system deviation is yielded from the difference of the determined sums; the smaller the difference between the sums, the higher the control performance.

The model parameters of the transfer model, namely, the gain, damping coefficient D, and time constant T, may be calculated back to from parameters a, b of the ARMAX model. Using appropriate criteria, damping coefficient D and time constant T may be assigned a measure of quality accordingly.

The measure of quality may be calculated at predefined intervals, that is, at each time step or after a predetermined number of time steps, in order to allow, in this manner, constant monitoring of the control device during operation of controlled system 1. The measure of quality may be ascertained, for example, as a difference from a predefined value of the time constant and/or a difference from a damping coefficient value of 1.

In step S3, it is checked if the measure of quality currently ascertained corresponds to a predefined quality criterion. For example, the quality criterion may inquire if the operating point determined by current damping coefficient D and current time constant T is situated within a range about the predefined value of time constant T and the damping coefficient D of 1, or lies outside of it. If damping coefficient D and time constant T lie within the predefined range (the "yes" alternative), the method continues at step S1. Otherwise (the "no" alternative), a fault of the control device is signaled in step S4.

Alternatively, the above method may be used for evaluating a system model, by which the physical behavior of a technical system is intended to be modeled. In this context, the input value of the input variable corresponds to the model value of the system model, and the output variable corresponds to a measured variable of the technical system. The simulation of the technical system by the system model may be determined from the input variable and output variable in accordance with the measure of quality ascertained as described above. This allows the system model to be adapted manually or automatically (iteratively) to the actual physical behavior of the technical system and allows this to be used, e.g., for the application of a control layout having an observer, or for system optimization.

Example embodiments of the present invention are also described in the following numbered Examples.

Example 1. A method for, in particular, continuously determining a measure of quality (G) for a control device of a technical device (3) or for a system model of a technical system, from an input variable (u) and an output variable (y); time series of the input variable (u) and the output variable (y) being acquired up to a time step (S1); a discrete ARMAX model structure being adapted (S2) for the ascertained, corresponding time series of the input variable and output variable, in order to determine a first set of parameters (A) for modeling the time series of the input variable (u) and a second set of parameters (B) for modeling the time series of the output variable (y); the measure of quality (G) being determined for the time step (t) as a function of the first and the second set of parameters (A, B).

Example 2. The method as recited in Example 1, wherein the ARMAX model structure includes a transfer function, which corresponds to a PT2 element.

Example 3. The method as recited in Example 1 or 2, wherein the sets of parameters (A, B) are ascertained, assuming a noise level of 0.

Example 4. The method as recited in one of the Examples 1 through 3, wherein the measure of quality (G) of a control device is determined by selecting a predefined setpoint as an input variable (u) and a predefined process variable as an output variable (y) of the control device; the control device having a transfer function; model parameters of the transfer function, in particular, a gain (K), a time constant (T), and a damping coefficient (D), are determined from the first and the second sets of parameters (A, B); and the measure of quality (G) is determined from the model parameters.

Example 5. The method as recited in Example 4, wherein the measure of quality (G) is determined as a function of a difference of the damping coefficient (D) from a value of 1 and/or as a function of a difference of the time constant (T) from a predefined setpoint value.

Example 6. The method as recited in one of the Examples 1 through 3, wherein the measure of quality is determined as a function of the difference between the sum of the parameters of the first set of parameters (A) and the sum of the parameters of the second set of parameters (B); and, in particular, the measure of quality (G) is a function of a difference of the above difference from a comparison variable, which corresponds, in particular, to a difference of the sum of the parameters of the first set of parameters (A) and the sum of parameters of the second set of parameters (B) in an adjusted state.

Example 7. The method as recited in one of Examples 1 through 6, wherein the measure of quality (G) is used for adapting the control device of the technical device (3).

Example 8. The method as recited in one of the Examples 1 through 4, wherein the measure of quality (G) is ascertained continuously in consecutive time steps; and a fault of the control device is detected (S3) as a function of the value or of a temporal change in the measure of quality (G), and in response to the detection of a fault, it is signaled (S4).

Example 9. The method as recited in one of the Examples 1 through 3, wherein the measure of quality (G) of the system model is determined by selecting a modeled system variable as an input variable (u) and a measured system variable as an output variable (y); model parameters of the system model, in particular, a time constant (T) and a damping coefficient (D), are determined from the first and second sets of parameters (A, B); and the measure of quality (G) is determined from the model parameters.

Example 10. The method as recited in Example 9, wherein the system model is adapted as a function of the measure of quality (G).

Example 11. A device, in particular, a control unit (4), for, in particular, continuously determining a measure of quality (G) for a control device of a technical device (3) or for a system model of a technical system (1), from an input variable (u) and an output variable (y); the device is configured to acquire time series of the input variable (u) and the output variable (y) up to a time step; and a discrete ARMAX model structure is adapted for the ascertained, corresponding time series of the input variable and output variable, in order to determine a first set of parameters (A) for modeling the time series of the input variable (u) and a second set of parameters (B) for modeling the time series of the output variable (y), and in order to determine the measure of quality (G) for the time step (t) as a function of the first and the second set of parameters (A, B).

Example 12. A computer program product, including commands that, in response to the execution of the commands by at least one data processing device, cause it to carry out the steps of the method according to one of Examples 1 through 10.

Example 13. A machine-readable storage medium, including commands that, in response to execution by at least one data processing device, cause it to carry out the steps of the method according to one of Examples 1 through 10.

What is claimed is:

1. A method for continuously adapting a control device of a technical device during operation of the technical device, the method comprising:
acquiring a time series of an input variable, wherein the time series of the input variable includes a plurality of values of the input variable up to a time step and wherein the input variable is a setpoint which the control device operates the technical device to attain using a control function;
acquiring a time series of an output variable, wherein the time series of the output variable includes a plurality of values of the output variable up to the time step and wherein the output variable is an actual state which the technical device produces due to operation by the control device using the control function;
using a discrete Autoregressive Moving Average Model with Exogenous Inputs (ARMAX) model structure for the ascertained time series of the input variable and the ascertained time series of the output variable to determine a first set of parameters for modeling the time series of the input variable and a second set of parameters for modeling the time series of the output variable; and based on a quality for the time step, as indicated by the first and the second sets of parameters, automatically modifying the control function, thereby modifying the operation of the technical device to produce different values of the output variable for respective values of the input variable.

2. The method as recited in claim 1, wherein the ARMAX model structure includes a transfer function, which corresponds to a second-order delay element.

3. The method as recited in claim 1, wherein the first and second sets of parameters are ascertained, assuming a noise level of 0.

4. The method as recited in claim 1, wherein model parameters including a gain, a time constant, and a damping coefficient, are determined from the first and the second sets of parameters, and wherein the quality, upon which the automatic modification is based, is as indicated by the model parameters.

5. The method as recited in claim 4, wherein the quality, upon which the automatic modification is based, is as indicated by a difference of the damping coefficient from a value of 1.

6. The method as recited in claim 4, wherein the quality, upon which the automatic modification is based, is as indicated by a difference of the time constant from a predefined setpoint value.

7. The method as recited in claim 1, wherein a measure of the quality is ascertained continuously in consecutive time steps, and a fault of the control device, based on which the control function is modified, is detected as a function of a value of the measure of the quality or of a temporal change in the measure of the quality.

8. The method as recited in claim 1, wherein:
a modeled system variable of a system model is selected as the input variable and a measured system variable is selected as the output variable;
model parameters of the system model, including a time constant and a damping coefficient, are determined from the first and second sets of parameters, and
a measure of the quality is determined from the model parameters.

9. The method as recited in claim 8, wherein the system model is adapted as a function of the measure of the quality.

10. A method for continuously adapting a control device of a technical device during operation of the technical device, the method comprising:
acquiring a time series of an input variable and a time series of an output variable up to a time step;
adapting a discrete Autoregressive Moving Average Model with Exogenous Inputs (ARMAX) model structure for the ascertained time series of the input variable and the ascertained time series of the output variable, to determine a first set of parameters for modeling the time series of the input variable and a second set of parameters for modeling the time series of the output variable; and
based on a measure of a quality for the time step determined as a function of a first difference between a sum of the parameters of the first set of parameters and a sum of the parameters of the second set of parameters, automatically modifying the control device, thereby modifying operation of the technical device to produce different values of the output variable for respective values of the input variable.

11. The method as recited in claim 10, wherein the measure of quality is a function of a difference of the first difference from a comparison variable, which corresponds to a second difference of the sum of the parameters of the first set of parameters and the sum of parameters of the second set of parameters in an adjusted state.

12. A system comprising:
a control unit;
a control device; and
a technical device;
wherein, during operation of the technical device, the control unit is configured to:
acquire a time series of an input variable, wherein the time series of the input variable includes a plurality of values of the input variable up to a time step and wherein the input variable is a setpoint which the control device operates the technical device to attain using a control function;
acquire a time series of an output variable, wherein the time series of the output variable includes a plurality of values of the output variable up to the time step and wherein the output variable is an actual state which the technical device produces due to operation by the control device using the control function;
use a discrete Autoregressive Moving Average Model with Exogenous Inputs (ARMAX) model structure for the time series of the input variable and the time series of the output variable to determine a first set of parameters for modeling the time series of the input variable and a second set of parameters for modeling the time series of the output variable; and
based on a quality for the time step, as indicated by the first and the second sets of parameters, automatically modify the control function, thereby modifying the operation of the technical device to produce different values of the output variable for respective values of the input variable.

13. A non-transitory machine-readable storage medium on which is stored a computer program that is executable by a processor, and that, when executed by the processor, causes the processor to perform a method for continuously adapting a control device of a technical device during operation of the technical device, the method comprising:
acquiring a time series of an input variable, wherein the time series of the input variable includes a plurality of values of the input variable up to a time step and wherein the input variable is a setpoint which the control device operates the technical device to attain using a control function;
acquiring a time series of an output variable, wherein the time series of the output variable includes a plurality of values of the output variable up to the time step and wherein the output variable is an actual state which the technical device produces due to operation by the control device using the control function;
using a discrete Autoregressive Moving Average Model with Exogenous Inputs (ARMAX) model structure for the ascertained time series of the input variable and the ascertained time series of the output variable to determine a first set of parameters for modeling the time series of the input variable and a second set of parameters for modeling the time series of the output variable; and
based on a quality for the time step, as indicated by the first and the second sets of parameters, automatically modifying the control function, thereby modifying the operation of the technical device to produce different values of the output variable for respective values of the input variable.

* * * * *